United States Patent [19]

Schuster

[11] Patent Number: 6,026,347
[45] Date of Patent: Feb. 15, 2000

[54] OBSTACLE AVOIDANCE PROCESSING METHOD FOR VEHICLES USING AN AUTOMATED HIGHWAY SYSTEM

[75] Inventor: Steven K. Schuster, Fullerton, Calif.

[73] Assignee: Raytheon Company, Lexington, Mass.

[21] Appl. No.: 08/865,817

[22] Filed: May 30, 1997

[51] Int. Cl.⁷ .................................................. G06F 15/00
[52] U.S. Cl. ........................... 701/301; 701/200; 701/27; 701/96; 342/70; 342/71; 340/435; 340/436; 340/903; 180/167; 180/168
[58] Field of Search ..................................... 701/301, 200, 701/300, 96, 23, 24, 25, 26, 27; 180/167–9, 168; 340/435, 6, 903, 4, 436; 342/70, 71

[56] References Cited

U.S. PATENT DOCUMENTS

| | | | |
|---|---|---|---|
| 3,735,398 | 5/1973 | Ross | 342/21 |
| 5,332,057 | 7/1994 | Butsuen et al. | 180/169 |
| 5,369,591 | 11/1994 | Broxmeyer | 364/436 |

FOREIGN PATENT DOCUMENTS

| | | |
|---|---|---|
| 0649776 | 4/1995 | European Pat. Off. . |
| WO9002985 | 3/1990 | WIPO . |

*Primary Examiner*—Jacques H. Louis-Jacques
*Assistant Examiner*—Yonel Beaulieu
*Attorney, Agent, or Firm*—Daly, Crowley & Mofford, LLP

[57] ABSTRACT

A method for use in vehicles using lanes of an automated highway to avoid collisions with obstacles. A set of decision rules are embodied in a processor that are used in each vehicle to determine whether affected vehicles should change lanes or brake to minimize the expected impact with an obstacle. The presence of an obstacle in one of the lanes is detected by a lead vehicle or by sensors on the highway. The processor in the lead vehicle, or at a traffic management facility, probabilistically estimates the position of the obstacle at each of a plurality of times subsequent to detection. At each of the times, a course of action for all affected vehicles is determined by the processor in the lead vehicle based upon the best current estimate of position of the obstacle, knowledge of any previous action that has been taken, positions and velocities of the affected vehicles, and the geometry of the highway. At each of the times, each of the affected vehicles is commanded to perform an avoidance maneuver that is coordinated with the other affected vehicles, wherein affected vehicles brake and change lanes to avoid collision with the obstacle and with other vehicles. At each of the times, commands are sent to each affected vehicle that cause them to perform hard braking, light braking, maintain speed, resume previous speed, perform a lane change, abort a lane change or create a gap, so as to minimize the impact of the vehicles with the obstacle.

20 Claims, 6 Drawing Sheets

OBSTACLE AVOIDANCE PROCESSING METHOD FOR VEHICLES USING AN AUTOMATED HIGHWAY SYSTEM

BACKGROUND

The present invention relates generally to obstacle avoidance methods, and more particularly, to an obstacle avoidance method that may be employed in fully or partially automated vehicles using an automated highway system.

It has been determined that, in 1994, for example, about eight percent of all reported accidents on interstate highways involved obstacles. Forty-seven percent of these accidents involve animals on or approaching the highway. Thirty nine percent of these accidents involve objects on or approaching the highway. Three percent of these accidents involve persons on the highway.

There are several techniques currently under investigation for dealing with obstacles. A first technique involves obstacle exclusion, such as using fencing, which solves part of the problem, but does not deal with obstacles such as vehicle components and debris. A second technique involves obstacle detection using vehicle-mounted or roadway mounted sensors or both. A third technique, which is the subject of the present invention, involves a combination of braking and lane changing. Current obstacle avoidance techniques for use in automated and partially automated vehicles all use braking as the sole means of avoiding a collision with an obstacle, or minimizing the impact with the obstacle.

Accordingly, it is an objective of the present invention to provide for an improved obstacle avoidance method for use in fully or partially automated vehicles using an automated highway system. It is a further objective of the present invention to provide for an obstacle avoidance method that employs both braking and lane change maneuvers to avoid a collision with or minimize impact with an obstacle.

SUMMARY OF THE INVENTION

To meet the above and other objectives, the present invention provides for an obstacle avoidance processing method or algorithm for use with an automated highway system. The obstacle avoidance processing method or algorithm minimizes the average (expected value) collision impact of one or more fully or partially automated vehicles with an obstacle on the highway, by performing a series of coordinated avoidance maneuvers.

In accordance with the obstacle avoidance method or algorithm, a set of decision rules is provided for determining whether affected vehicles that could potentially impact an obstacle should change lanes or brake to minimize the expected impact with the obstacle. The presence of an obstacle in one of the automated lanes is sensed. After sensing the presence of the obstacle, the affected vehicles performs a series of coordinated avoidance maneuvers using the set of decision rules, wherein the affected vehicles cooperatively brake and/or change lanes to avoid collision with the obstacle and with other affected vehicles.

There are two major components comprising the obstacle avoidance processing method or algorithm. The first component is a set of decision rules that are used to determine whether the vehicle(s) should change lanes or brake in order to minimize the expected impact with the obstacle. In making this decision, the estimated position of the obstacle (based on sensor measurements) is treated probabilistically to minimize the expected drop in forward vehicle speed ($\Delta V$) due to the collision with the obstacle. The second component of the algorithm is a series of maneuvers, coordinated by communication between vehicles or with a traffic management facility, that allow vehicle(s) in the same lane as the obstacle to change lanes in the smallest possible safe distance. The probabilistic treatment of the position of the obstacle and the process of deciding between braking and lane changing in order to minimize expected collision impact are novel improvements provided by the present invention.

The present obstacle avoidance method or algorithm increases vehicle safety in the event that there is an obstacle on the highway. Increasing safety in this case means minimizing the average drop (expected value) in forward vehicle speed ($\Delta V$) due to the collision with the obstacle. This is equivalent to minimizing the total drop in forward vehicle speed ($\Delta V$) and the associated injuries and property damage over many such obstacle incidents.

The obstacle avoidance method or algorithm provides an advantage over "manual" drivers (vehicles driven by people) in that it increases vehicle safety by reducing the average collision impact, injuries, and property damage over many obstacle incidents. The present invention does this using a more complex decision-making process than a human driver is capable of making, and by faster and more reliable communication among vehicles than is possible using devices such as turn signals and horns.

The obstacle avoidance method or algorithm provides for an improvement over automated and partially automated vehicle designs that use braking to avoid collisions with obstacles, to minimize the impact. The obstacle avoidance algorithm results in a lower expected (average) drop in forward vehicle speed, or, when viewed over many obstacle incidents, results in a reduced level of injuries and property damage.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
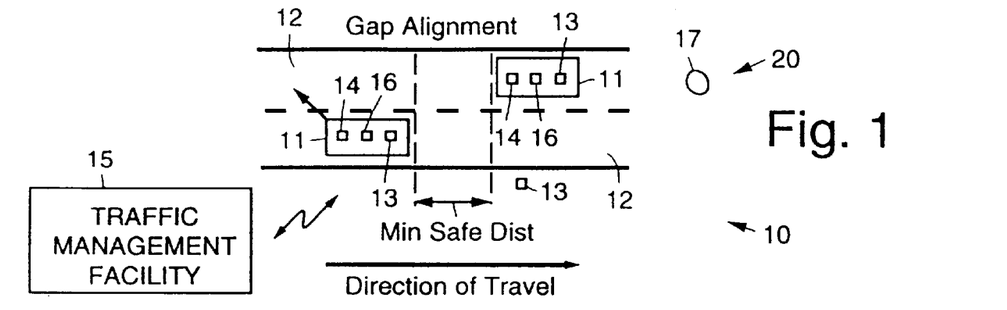
FIG. 1 illustrates an operational scenario employing an obstacle avoidance processing method in accordance with the principles of the present invention, and illustrates the geometry of gap alignment employed therein.

Referring to the drawing figures, FIG. 1 illustrates an operational scenario involved in using an obstacle avoidance processing method 20 or algorithm 20 in accordance with the principles of the present invention. FIG. 1 also illustrates the geometry of gap alignment employed in the present invention. The obstacle avoidance processing method 20 or algorithm 20 is designed for use with automated vehicles 11 that use an automated highway 10. The obstacle avoidance processing method 20 or algorithm 20 may be employed as follows.

The automated highway 10 includes two or more adjacent dedicated automated lanes 12 (also identified as lanes 12a, 12b for clarity), wherein all vehicles 11 using these lanes 12 are automated, and wherein the vehicles 11 move in the same direction in both lanes 12a, 12b. The automated highway 10 is a freeway-type highway, having no traffic signals or stop signs, no intersecting cross-streets, and a median strip or barrier (not shown) disposed between automated lanes 12 dedicated for vehicles 11 moving in opposite directions.

An obstacle detection sensor 13 (such as a radar, for example) that estimates the position and velocity of an object 17 or obstacle 17 is disposed on each vehicle 11 or on (or adjacent to) the highway 10. Obstacles 17 include such things as animals, debris that has fallen onto the highway 10, vehicle components such as a tire or muffler, or stalled vehicles 11. All vehicles 11 communicate with each other, or with a traffic management facility 15 responsible for monitoring and regulating traffic flow, using transponders 14, for example.

Each vehicle 11 includes a processor 16 that is coupled to the vehicle's braking, steering and engine management systems (not Shown) that can accept commands from other vehicles 11 to brake, accelerate, or change lanes, or from the traffic management facility 15 (if it is employed). The processor 16 is also coupled to the transponder 14 and sensor 13 and processes sensed signals and commands using the present method 20 or algorithm 20.

The obstacle avoidance method 20 or algorithm 20 may be divided into two processes for ease of understanding. The first is a decision-making process that iterates three times. On each iteration, the decision-making process uses the best current estimate of position of the obstacle 17, knowledge of any previous action that has been taken, positions and velocities of all vehicles 11 within the operating range of the vehicle 11, and the geometry of the highway 10, and determines a course of action for affected vehicles 11. Affected vehicles 11 are those in the lane 12 where the obstacle 17 is estimated to be, or in dedicated automated lanes 12 immediately adjacent to the lane 12 containing the obstacle 17.

The decision-making process is supported by braking and lane changing protocols, or decision rules. Each protocol divides the highway 10 into a series of imaginary longitudinal strips, or zones. At each of three decision times, an action is chosen based on the best estimate of the zone in which the obstacle 17 is located, and on the relative position of the vehicles 11 that are in the lane 12 containing the obstacle 17 and adjacent lanes 12. When viewed as a whole, the sequence of actions for each obstacle avoidance event (lane changing and hard braking) is chosen successively at the three decision times and forms a decision tree with six to fourteen branches.

The second process is a response by vehicles 11 to the commands that have been transmitted. The vehicles 11 receiving commands accelerate, decelerate, or maintain speed longitudinally and laterally in order to perform light braking, hard braking, or initiate or abort a lane change, as cornmanded. Simultaneously, additional sensor measurements are taken by either the vehicle 11 nearest to the obstacle 17 or by roadside obstacle sensors 13 (depending on the location of the sensors 13) to improve the estimate of the position of the obstacle 17. The algorithm 20 then iterates, using the updated estimate of the position of the obstacle 17, and a knowledge of the previous actions that have been commanded, to generate a new set of commands for the affected vehicles 11. With each successive iteration, there are options that are dropped from the list of feasible maneuvers, since there is insufficient time to complete them before the obstacle 17 is reached.

The obstacle avoidance algorithm 20 builds on a number of lower-level concepts, referred to herein as building blocks. These will be briefly explained first to provide a better understanding of the obstacle avoidance algorithm 20. For the purpose of describing these building blocks and the algorithm 20, the following scenario is used with reference to FIG. 1. There are two dedicated automated lanes 12 (equipped for use by automated vehicles 11) with traffic moving in the same direction, operating at near capacity. All vehicles 11 have obstacle detection sensors 13 that communicate with other vehicles 11, and determine the relative positions of nearby vehicles 11. An obstacle 17 is initially detected in the right lane 12 of the highway 10 some distance ahead of a group of vehicles 11. If the obstacle 17 were initially detected in the left lane 12, a mirror image of the algorithm 20 would be executed, with right and left reversed in each case.

Two levels (or ranges) of braking are used to implement obstacle avoidance using the obstacle avoidance algorithm 20. The first, referred to as "hard braking", is the maximum longitudinal deceleration that the vehicle 11 can attain, consistent with any lateral acceleration or deceleration that is required at the time. The second level of braking is referred to as "light braking". Light braking is used when there is substantial uncertainty about whether the obstacle 17 is in the path of the vehicle 11. The purpose is of light braking to reduce the speed of the vehicle 11 in preparation for hard braking, while minimizing passenger discomfort.

Figure 2:
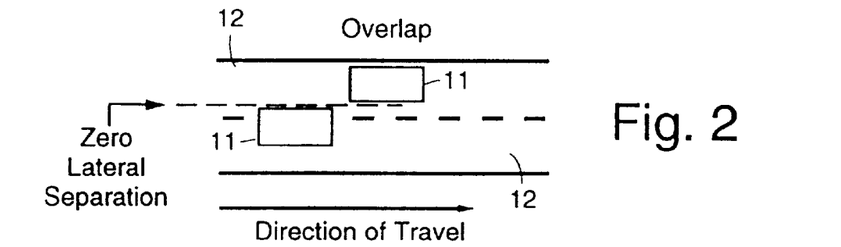
FIG. 2 illustrates the overlap geometry used in the method.

Gap alignment is the first phase of a lane change implemented using the obstacle avoidance algorithm 20. In the present example, it is performed by vehicles 11 in the right lane 12 and is implemented by these vehicles accelerating or decelerating laterally and longitudinally (illustrated in FIGS. 3 and 4 by arrows originating from the vehicles 11), depending on whether they lead or lag the left lane vehicles 11, and by the left lane vehicles 11 either maintaining speed decelerating or accelerating laterally and longitudinally as shown. Gap alignment ends when the two vehicles 11 are separated longitudinally by a minimum safe distance. This minimum safe longitudinal distance is the smallest separation that is acceptable during an emergency maneuver, and is much smaller than the distance required for safe braking during routine operation. As is shown in FIG. 2, if the vehicle 11 in the right lane 12 happens to be alongside a gap in the left lane 12 when the maneuver starts, then gap alignment is already completed.

Merging is the second phase of a lane change. Merging begins while gap alignment is taking place, and is timed so that gap alignment achieves the minimum safe distance between vehicles 11 just as overlap occurs. Overlap occurs when the left edge of the vehicle 11 in the right lane 12 lines up with the right edge of the vehicle 11 in the left lane as shown in FIG. 2. Merging ends when the left and right edges of the vehicles 11 are aligned longitudinally (i.e., directly behind one another). Vehicle separation, however, is monitored by the obstacle avoidance algorithm 20 until the speed of the vehicle 11 merging from the right lane 12 is the same as the speed of the vehicles 11 in the left lane 12.

Figure 3:
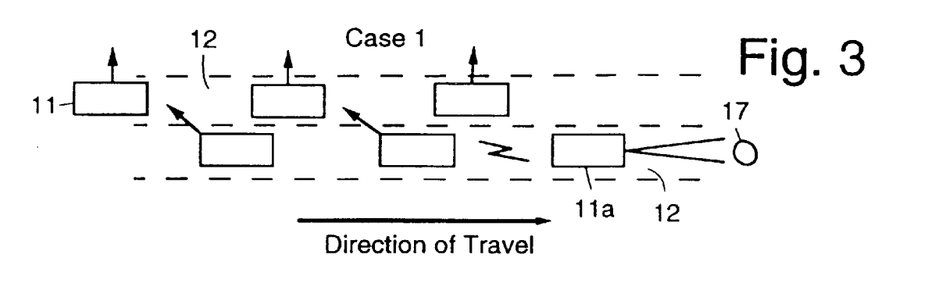
FIG. 3 illustrates the geometry of a Case 1 lane change.
Figure 4:
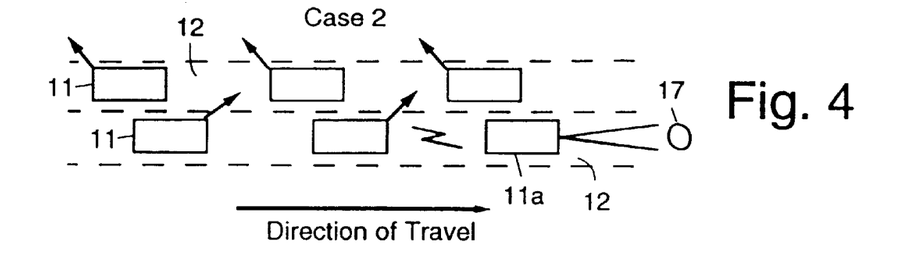
FIG. 4 illustrates the geometry of a Case 2 lane change.

Lane changes are referred to as Case 1 or Case 2 lane changes, depending on whether gap alignment is achieved by longitudinally decelerating or accelerating vehicles 11 in the right lane. FIG. 3 illustrates the geometry of a Case 1 lane change. The Case 1 lane change is a more conservative maneuver and is used if substantial uncertainty about the position of the obstacle 17 exists, since the vehicles 11 in the right lane 12 reduce speed, decreasing the expected forward vehicle speed that would occur at the time of a collision should the maneuver fail. However, at most speeds and spacings between vehicles 11, a Case 1 lane change is not possible from all geometries, so a Case 2 lane change must be used with some geometries. FIG. 4 illustrates the geometry of a Case 2 lane change. Whether Case 1 or Case 2 lane changes predominate depends on the relative speeds of the vehicles 11 in the two lanes 12 in which the maneuver starts and finishes.

Figure 5:
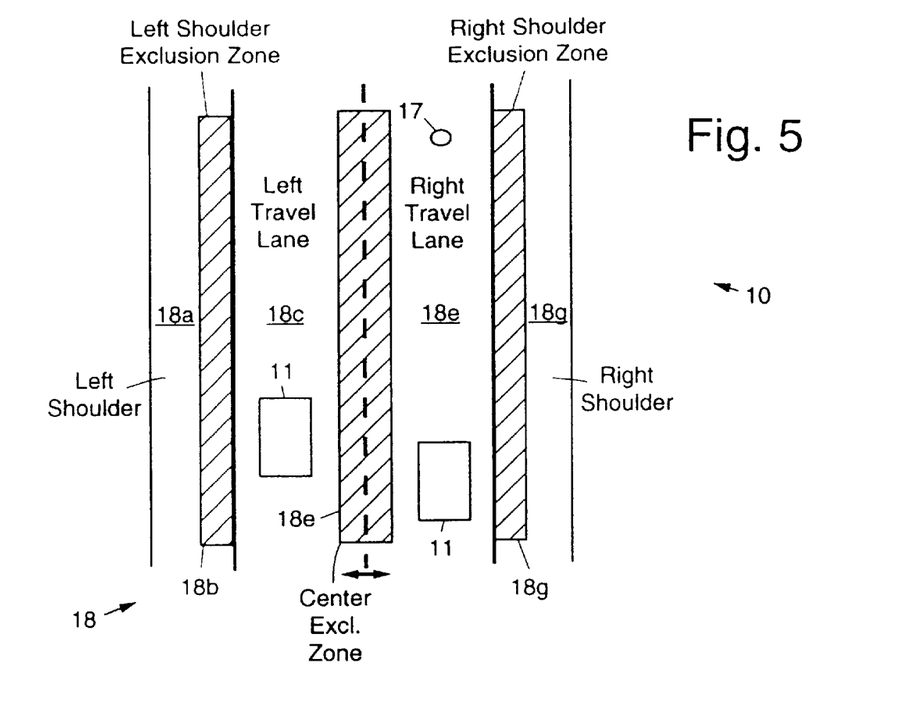
FIG. 5 illustrates an exemplary lane changing and obstacle avoidance protocol geometry used in the method.

Braking and lane change protocols will now be discussed. Referring to FIG. 5, a series of longitudinal protocol zones 18 is formed on the dedicated automated lanes 12. These zones 18 are imaginary subdivisions of the width of the highway 10 used for the purpose of decision-making. Three exclusion zones 18b, 18d, 18f are used that are buffers which reduce the likelihood that small position estimation errors will produce high $\Delta V$ consequences. The three exclusion zones 18b, 18d, 18f correspond to the left shoulder exclusion zone 18b, the center exclusion zone 18d, and the right shoulder exclusion zone 18f, respectively.

Protocol decision times will now be discussed. The purpose of having multiple protocol decision times is to allow the obstacle avoidance algorithm 20 to reassess the situation at particular times as knowledge of the position of the obstacle 17 improves over time. This protocol design uses three decision times, $T_0$ $T_1$ and $T_2$. At time $T_0$, the obstacle 17 has already been acquired and has been tracked by the sensor 13 for a distance determined by the maximum range of the sensor 13, and the distance required to change lanes 12. Time $T_0$ is defined as the last time at which lane changing can be initiated. Light braking is done prior to time $T_0$, since it is initiated when the obstacle 17 is first detected.

Figure 6:
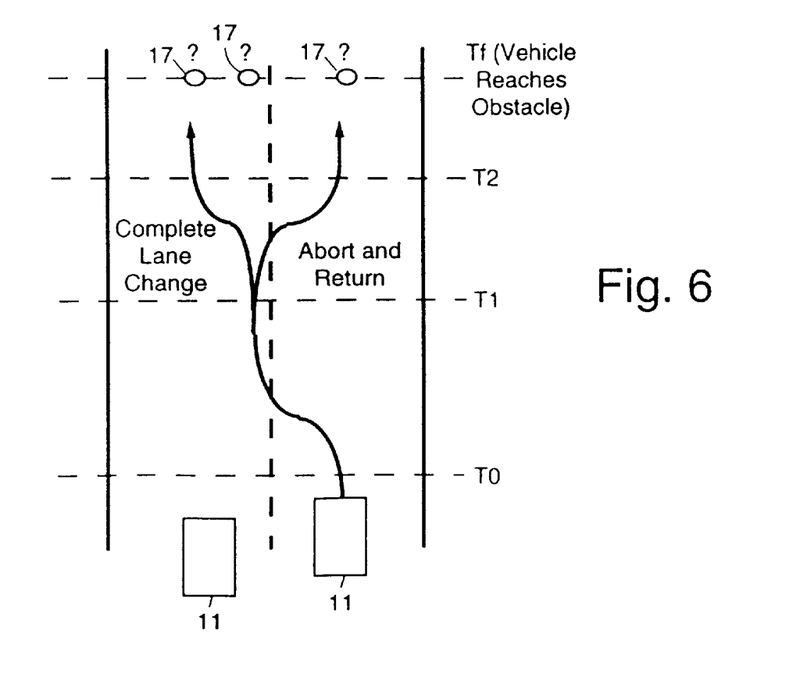
FIG. 6 illustrates lane change decision times employed in the method.

Time $T_1$ is the last time at which a lane change can be safely aborted. Time $T_1$ usually falls about halfway through the time period available for obstacle avoidance. As is shown in FIG. 6, the lane changing protocol supports the choice of two alternative actions at time $T_1$. Time $T_1$ is the last time at which a change in lateral acceleration will have any significant effect before the obstacle 17 is reached. Time $T_2$ is the final decision time, and occurs about midway between $T_1$, and $T_f$, which is a time at which the vehicle 11 reaches the position of the obstacle 17. Lane changing protocol options at time $T_2$ are to continue the action chosen at time $T_1$, or to perform hard braking 21 if the updated estimate of position of the obstacle 17 makes the former a poor choice.

Figure 7A:
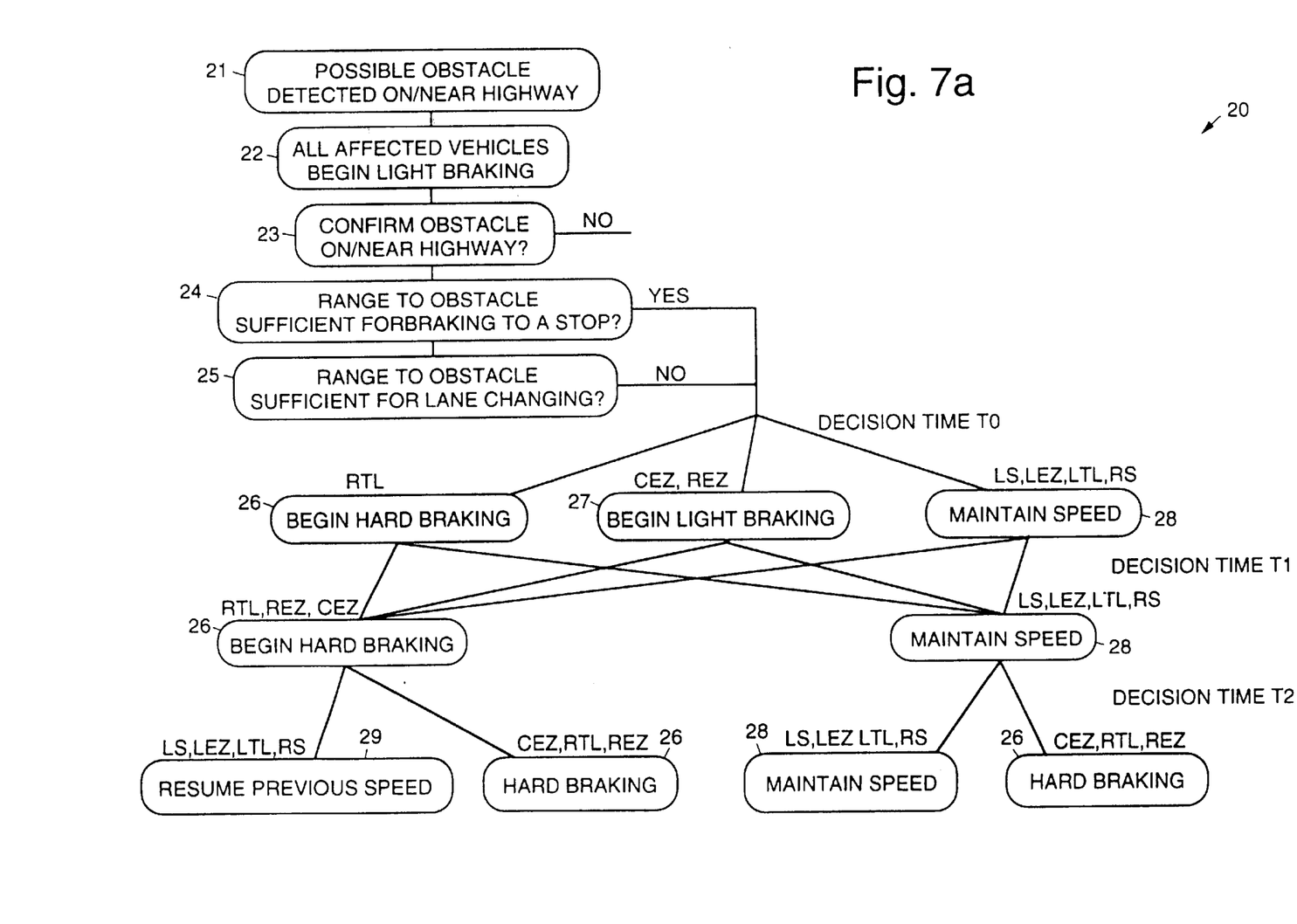
FIGS. 7a–7c illustrate lane changing and obstacle avoidance protocols in accordance with the present invention.
Figure 7B:
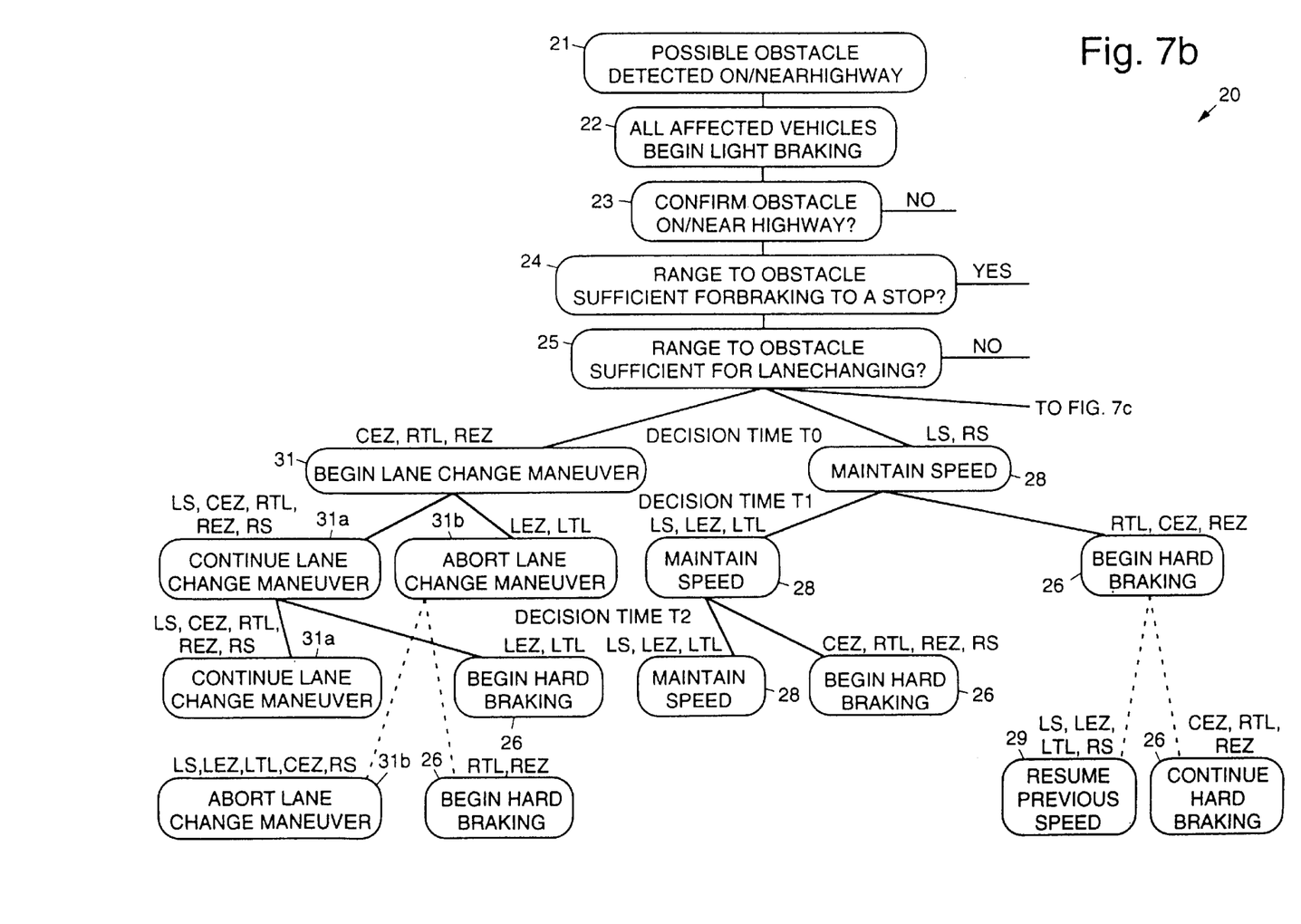
Figure 7C:
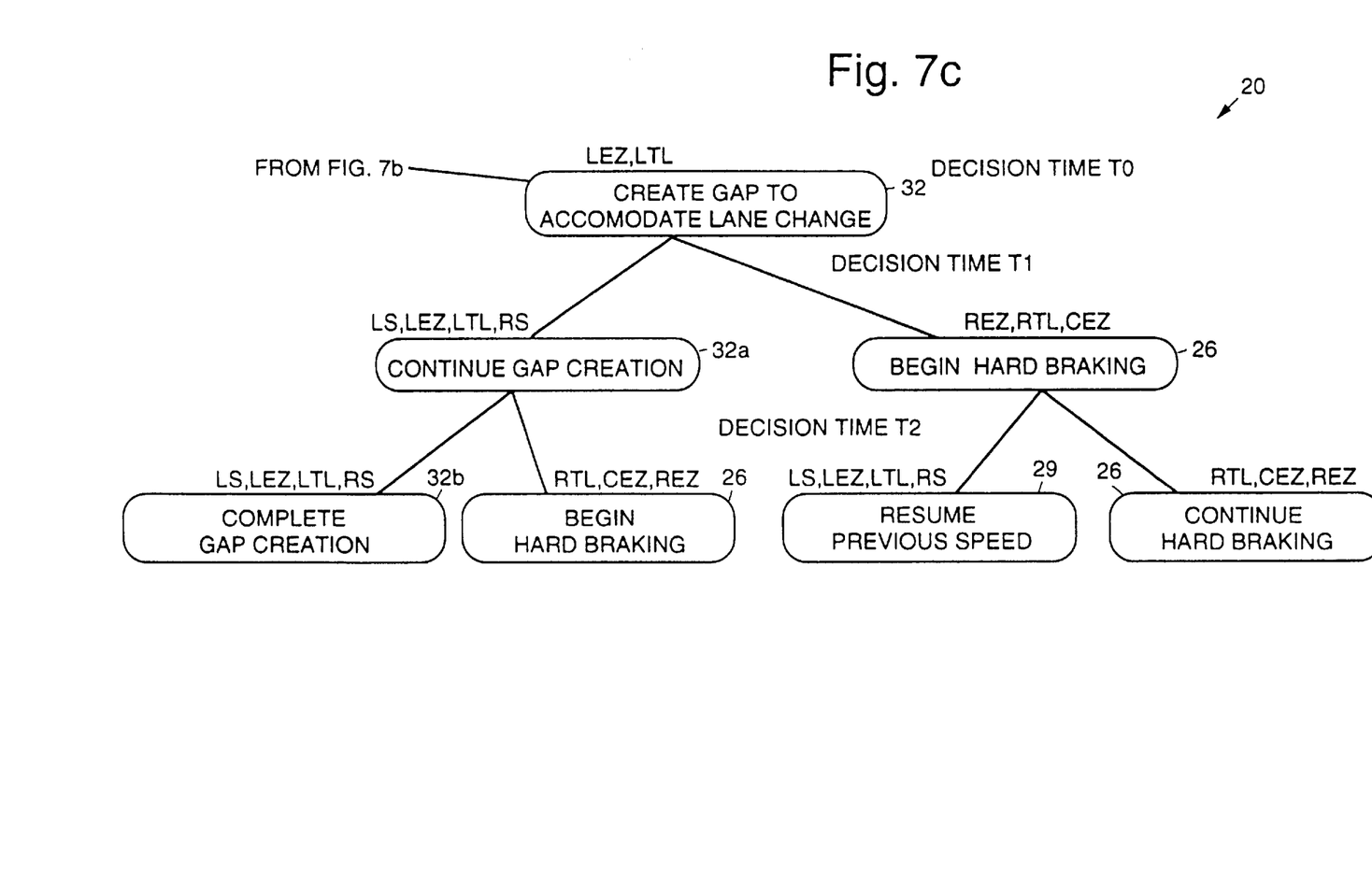

Protocol action sequences will now be discussed. When viewed as a whole, the sequence of actions for each obstacle avoidance strategy (lane changing and hard braking) chosen successively at $T_0$, $T_1$, and $T_2$ form a decision tree with six (hard braking) to fourteen (lane changing) branches, such as is shown in FIGS. 7a–7c. For any given scenario, each branch of the decision tree is characterized by a probability that this series of actions will be chosen, and by an expected $\Delta V$ if the series of actions is chosen. The probability is computed from conditional probabilities of the sequence of actions given a particular location (zones 18a–18g) for the obstacle 17, weighted by the likelihood of the obstacle 17 being located in each zones 18a–18g. The conditional probability of an action, given a particular obstacle location (zones 18a–18g), is the probability that the estimated position of the obstacle 17 will be in zone i, given that the true location of the obstacle 17 is in zone j.

The codes that appear above the action boxes in FIGS. 7a–7c give the conditions when the actions described in the box are to be executed. The explanation of the codes is given below. The zones names are as shown in FIG. 5. For example, if the code CEZ appears above a box, then the action in the box is to be executed if the current (for that decision time) estimate of the position of the obstacle 17 falls within the center exclusion zone (CEZ). The zones names are as follows. LS—left shoulder, LEZ—left shoulder exclusion zone, LTL—left travel lane, CEZ—center exclusion zone, RTL—right travel lane, REZ—right shoulder exclusion zone, and RS—right shoulder.

Braking protocols will be discussed with reference to FIG. 7a. Referring to FIG. 7a, in the present method 20, a possible obstacle 17 is detected 21 on or near the highway 10. Upon possible detection of the obstacle 17, all affected vehicles 11 begin light braking 22. Confirmation 23 is made whether the obstacle 17 is on or near the highway 10. Then a determination 24 is made whether the range to the obstacle 17 is sufficient for braking the vehicle 11 to a stop. Then a determination 25 is made whether the range to the obstacle 17 is sufficient for a lane change. If the determination 24 regarding braking is yes, or the range to the obstacle 17 is not sufficient for a lane change, then the braking protocol (FIG. 7a) is executed.

If the estimated position of the obstacle 17 is in either the right travel lane, then hard braking 26 is initiated. If the estimated position of the obstacle 17 is in the center exclusion zone or the right shoulder exclusion zone, then light braking 27 is initiated. If the estimated position of the obstacle 17 is in either the left shoulder, left shoulder exclusion zones, left travel lane or right shoulder, then the vehicle 11 maintains 28 it speed. Each of these three operations at decision time $T_0$ have identical subdecisions that are made at decision time $T_1$, based on an updated estimated position of the obstacle 17 using sensor measurements made between time $T_0$ and time $T_1$. These are, if the estimated position of the obstacle 17 is in either the center exclusion zone, right travel lane or the right shoulder exclusion zones, then hard braking 26 is initiated, and if the estimated position of the obstacle 17 is in either the left shoulder, left shoulder exclusion zones, left travel lane or right shoulder, then the vehicle 11 maintains 28 it speed.

At time T2, the estimated position of the obstacle 17 is again updated, based on sensor measurements taken between time $T_1$ and time $T_2$. If hard braking 26 action is initiated at time $T_1$, then at time $T_2$, if the estimated position of the obstacle 17 is in either the left shoulder, left shoulder exclusion zones, left travel lane or right shoulder, then the vehicle 11 resumes 29 its previous speed, and if the estimated position of the obstacle 17 is in the center exclusion zone or the right travel lane or the right shoulder exclusion zones, hard braking 26 is initiated. If the vehicle 11 maintains it speed 28 at time $T_1$, then at time $T_2$, if the estimated position of the obstacle 17 is in either the left shoulder, left shoulder exclusion zones, left travel lane or right shoulder, then the vehicle 11 maintains 28 its speed, and if the estimated position of the obstacle 17 is in the center exclusion zone or the right travel lane or the right shoulder exclusion zones, hard braking 26 is initiated.

Lane changing protocols will be discussed with reference to FIGS. 7b and 7c. Referring to FIGS. 7b and 7c, in the present method 20, a possible obstacle 17 is detected 21 on or near the highway 10. Upon possible detection of the obstacle 17, all affected vehicles 11 begin light braking 22. Confirmation 23 is made whether the obstacle 17 is on or near the highway 10. Then a determination 24 is made whether the range to the obstacle 17 is sufficient for braking the vehicle 11 to a stop. Then a determination 25 is made whether the range to the obstacle 17 is sufficient for a lane change. If the determination 24 regarding braking is no, and the range to the obstacle 17 is sufficient for a lane change, then the lane changing protocol shown in FIGS. 7b and 7c is executed.

If the estimated position of the obstacle 17 is in the center exclusion zone, the right travel lane or the right shoulder exclusion zone, at decision time $T_0$, a lane change maneuver 31 is initiated. If the estimated position of the obstacle 17 is in the left or right shoulders, at decision time $T_0$, the vehicle 11 maintains speed 28. If the vehicle 11 is in the left shoulder exclusion zone or left travel lane, at decision time $T_0$, the vehicle 11 in the right lane creates 32 a gap to accommodate a lane change by the vehicle 11 in the left lane.

If a lane change maneuver 31 is initiated at time $T_0$, and the estimated position of the obstacle 17 is in the left shoulder, center exclusion zone, right travel lane, right shoulder exclusion zone or right shoulder, at decision time $T_1$, the lane change maneuver 31 is continued 31a. If a lane change maneuver 31 is initiated at time $T_0$, and the estimated position of the obstacle 17 is in the left shoulder exclusion zone or left travel lane, at decision time $T_1$, the lane change maneuver 31 is aborted 31b.

If the vehicle 11 maintains speed 28 at time $T_0$, and the estimated position of the obstacle 17 is in the left shoulder, left shoulder exclusion zone or left travel lane, then, at decision time $T_1$, the vehicle 11 maintains its speed 28. If the vehicle 11 maintains speed 28 at time $T_0$, and the estimated position of the obstacle 17 is in the center exclusion zone, the right shoulder exclusion zone, or the right travel lane, at decision time $T_1$, hard braking 26 is initiated.

If a gap is created 32 at decision time $T_0$, and if the estimated position of the obstacle 17 is in the left shoulder, left shoulder exclusion zone, left travel lane or right shoulder, at decision time $T_1$, gap creation is continued 32a. If a gap is created 32 at decision time $T_0$, if the vehicle 11 is in the right travel lane, right shoulder exclusion zone or center exclusion zone, at decision time $T_1$, the vehicle 11 hard braking 29 is initiated.

Between decision time $T_0$ and decision time $T_1$, additional sensor measurements are taken resulting in an updated estimate of the estimated position of the obstacle 17 at time $T_1$.

If the lane change maneuver is continued 31a at decision time $T_1$, and the estimated position of the obstacle 17 is in the left shoulder, center exclusion zone, right travel lane, right shoulder exclusion zone or right shoulder, at decision time $T_2$, the lane change maneuver 31 is continued 31b. If the lane change maneuver is continued 31a at decision time $T_1$, and the estimated position of the obstacle 17 is in the left shoulder exclusion zone or left travel lane, hard braking 26 is initiated at decision time $T_2$.

If the lane change maneuver 31 is aborted 31b at decision time $T_1$, and the estimated position of the obstacle 17 is in the left shoulder, left shoulder exclusion zone, left travel lane, center exclusion zone or right shoulder, at decision time $T_2$, the aborted lane change maneuver 31b is continued 31c. If the lane change maneuver is aborted 31b at decision time $T_1$, and the estimated position of the obstacle 17 is in the right travel lane or right shoulder exclusion zone, hard braking 26 is initiated at decision time $T_2$.

If the vehicle 11 maintains speed 28 at time $T_1$, and the estimated position of the obstacle 17 is in the left shoulder, left shoulder exclusion zone or left travel lane, the vehicle 11 maintains its speed 28 at decision time $T_2$. If the vehicle 11 maintains speed 28 at time $T_1$, and the estimated position of the obstacle 17 is in the center exclusion zone, the right travel lane, right shoulder exclusion zone or right shoulder, hard braking 26 is initiated at decision time $T_2$.

If hard braking 26 is initiated at time $T_1$, and the estimated position of the obstacle 17 is in the left shoulder, left shoulder exclusion zone, left travel lane or right shoulder, at decision time $T_2$, the vehicle 1 resumes 29 its previous speed. If hard braking 26 is initiated at time $T_1$, and the estimated position of the obstacle 17 is in the center exclusion zone, right travel lane, or right shoulder exclusion zone, at decision time $T_2$, hard braking 26 is continued.

If gap creation is continued 32a at time $T_1$, and the estimated position of the obstacle 17 is in the left shoulder, left shoulder exclusion zone, left travel lane or right shoulder, at decision time $T_2$, creation of the gap is completed 32b. If gap creation is continued 32a at time $T_1$, and the estimated position of the obstacle 17 is in the center exclusion zone, right travel lane, or right shoulder exclusion zone, hard braking 26 is initiated at decision time $T_2$.

If the vehicle 11 initiated hard braking 26 at time $T_1$, and the estimated position of the obstacle 17 is in the left shoulder, left shoulder exclusion zone, left travel lane or right shoulder, at decision time $T_2$, the vehicle 11 resumes 29 its previous speed. If the vehicle 11 initiated hard braking 26 at time $T_1$, and the estimated position of the obstacle 17 is in the center exclusion zone, right travel lane, or right shoulder exclusion zone, at decision time $T_2$, hard braking 26 is continued The set of actions for which conditional probabilities are computed is obtained using a protocol action matrix shown in Table 1, given the decision time and the estimated positions of the vehicle 11 and obstacle 17. More specifically, Table 1 shows braking and lane changing protocol actions as a function of decision time, and the protocol zone 18a–18g in which the estimated position of the obstacle 17 falls. The action codes are MS—maintain speed, CG—create gap (for vehicles that are changing lanes to move into), HB—hard braking, LB—light braking, LC—lane change, AB—abort lane change by returning to original lane, and RPS—resume previous speed.

TABLE 1

| Time | Previous Activity | Left Shoulder | LS Exclusive Zone | Left Travel Lane | Center Excl Zone | Right Travel Lane | RS Exclusive Zone | Right Shoulder |
|---|---|---|---|---|---|---|---|---|
| Braking Protocol | | | | | | | | |
| $t_0$ | None | MS | MS | MS | LB | HB | LB | MS |
| $t_1$ | Any | MS | MS | MS | HB | HB | HB | MS |
| $t_2$ | HB | RPS | RPS | RPS | HB | HB | HB | RPS |
| $t_2$ | MS | MS | MS | MS | HB | HB | HB | MS |
| Lane Changing Protocol | | | | | | | | |
| $t_0$ | None | MS | CG | CG | LC | LC | LC | MS |
| $t_1$ | LC | LC | AB | AB | LC | LC | LC | LC |
| $t_1$ | MS | MS | MS | MS | HB | HB | HB | MS |
| $t_1$ | CG | CG | CG | CG | HB | HB | HB | CG |
| $t_2$ | LC | LC | HB | HB | LC | LC | LC | LC |
| $t_2$ | AB | AB | AB | AB | AB | HB | HB | AB |
| $t_2$ | HB | RPS | RPS | RPS | HB | HB | HB | RPS |
| $t_2$ | CG | CG | CG | CG | HB | HB | HB | CG |

Figure 8:
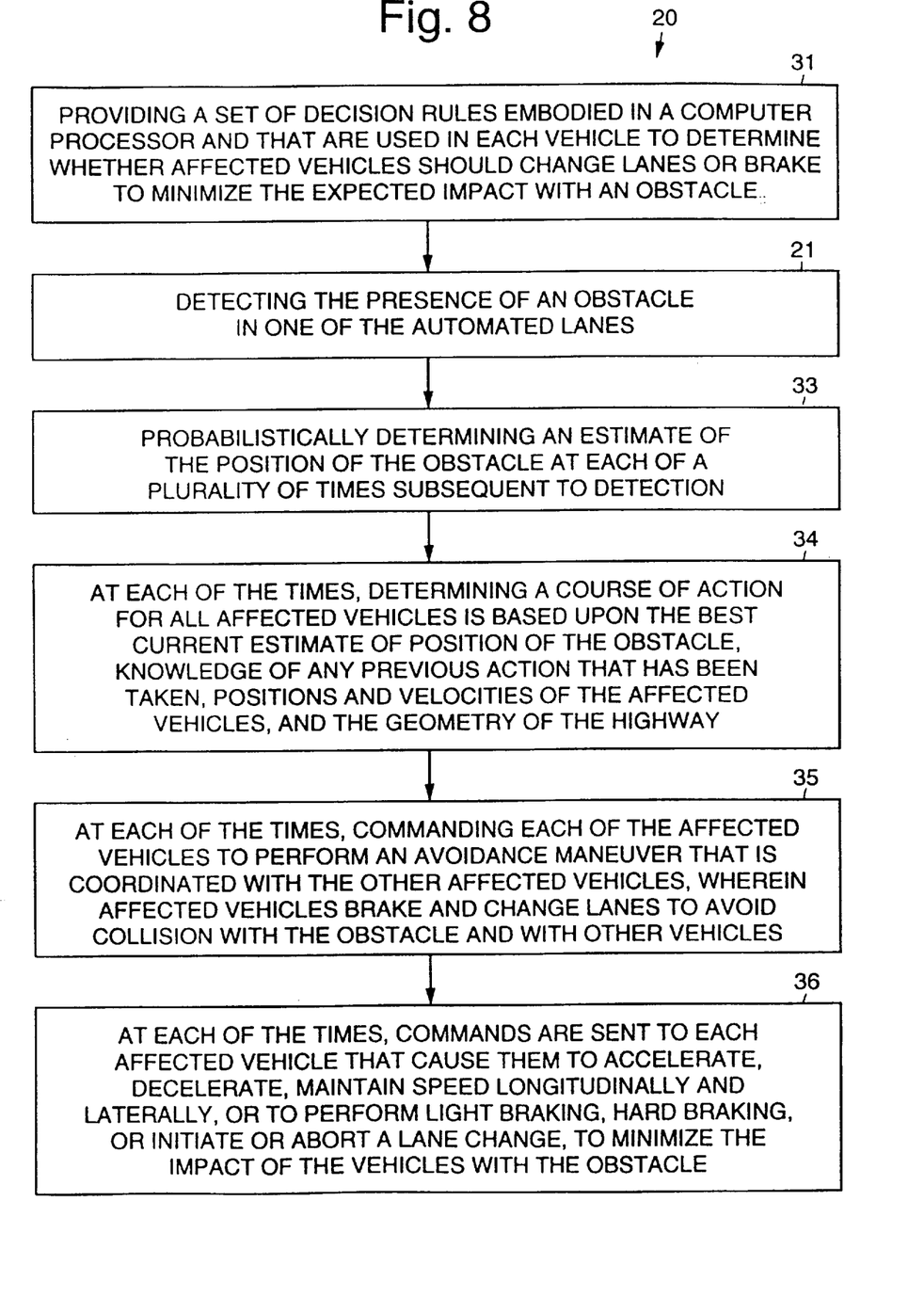
FIG. 8 is a flow chart illustrating steps involved in an obstacle avoidance processing method or algorithm in accordance with the principles of the present invention.

Referring to FIG. 8, it is a flow chart that illustrates basic steps involved in an embodiment of the present obstacle avoidance processing method 20 or algorithm 20. In accordance with the method 20, a set of decision rules is provided 31 that are embodied in a computer processor and that are used in each vehicle 11 to determine whether affected vehicles 11 should change lanes or brake to mninimize the expected impact with an obstacle 17.

In implementing the method 20, the presence of an obstacle in one of the automated lanes 12 is detected 21 by a lead vehicle 11. The processor in the lead vehicle 11 probabilistically determines an estimate 33 of the position of the obstacle 17 at each of a plurality of times subsequent to detection. At each of the times, a course of action for all affected vehicles 11 is determined 34 by the processor in the lead vehicle 11 of the traffic management facility 15 based upon the best current estimate of position of the obstacle 17, knowledge of any previous action that has been taken, positions and velocities of the affected vehicles 11, and the geometry of the highway 10.

At each of the times, each of the affected vehicles 11 is commanded 35 to perform an avoidance maneuver that is coordinated with the other affected vehicles 11, wherein affected vehicles 1 brake and change lanes to avoid collision with the obstacle and with other vehicles 11. At each of the times, commands are sent 36 to each affected vehicle 11 that cause them to perform hard braking 26, light braking 27, maintain speed 28, resume previous speed 29, perform a lane change 31, abort a lane change 31b or create a gap 32, so as to minimize the impact of the vehicles 11 with the obstacle 17.

Thus, an obstacle avoidance method for use with fully or partially automated vehicles that use an automated highway system has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An obstacle avoidance method for use with automated vehicles that use an automated highway having at least two adjacent automated lanes, that minimizes the impact of the automated vehicles with an obstacle, said method comprising the steps of:

providing a set of decision rules for determining whether affected vehicles that could potentially impact the obstacle should change lanes or brake to minimize the expected impact with the obstacle;

sensing the presence of the obstacle in one of the automated lanes;

determining by an iterative process a series of coordinated avoidance maneuvers for affected vehicles in the lane containing the obstacle and in lanes adjacent to the lane containing the obstacle in accordance with the set of decision rules, an estimate of the position of the obstacle, the positions and velocities of other affected vehicles and the geometry of the highway; and causing each of the affected vehicles to perform the series of coordinated avoidance maneuvers to avoid collision with the obstacle and with the other affected vehicles.

2. The method of claim 1 wherein the estimated position of the obstacle is treated probabilistically to minimize the expected drop in forward vehicle speed due to the collision with the obstacle.

3. The method of claim 1 wherein the estimated position of the obstacle is determined using sensor measurements.

4. The method of claim 1 wherein the series of coordinated maneuvers cause vehicles in the same lane as the obstacle to change lanes in the smallest possible safe distance.

5. The method of claim 1 wherein, upon each iteration, said determining step includes the step of determining the series of coordinated avoidance maneuvers using an updated estimate of the location of the obstacle and knowledge of previous actions that have been taken.

6. The method of claim 1 wherein the coordinated avoidance maneuvers are selected from the group of: hard braking, light braking, maintaining speed, resuming previous speed, performing a lane change, aborting a lane change or creating a gap.

7. The method of claim 1 wherein the automated vehicles communicate with a traffic management facility responsible for monitoring and regulating traffic flow.

8. The method of claim 1 wherein the automated vehicles communicate with each other using transponders.

9. An obstacle avoidance method for use with automated vehicles that use an automated highway having at least two adjacent automated lanes, wherein all vehicles using these lanes are automated and move in the same direction in both lanes, and wherein an obstacle detection sensor is provided that estimates the position and velocity of obstacles and wherein the position of the vehicles on the highway is known, and wherein vehicles communicate with each other, and wherein each vehicle includes a processor that processes sensed signals and commands, and includes braking, steering and engine management systems responsive to commands from other vehicles to brake, accelerate, or change lanes, said method comprising:

a decision-making process that iterates three times, and wherein on each iteration, the best current estimate of position of an obstacle, knowledge of any previous action that has been taken, positions and velocities of all vehicles within the operating range of the vehicle, and the geometry of the highway is used to determine a course of action for affected vehicles, and wherein the highway is divided into a series of longitudinal zones, and wherein at each of three decision times, an action is chosen based on the estimate of the zone in which the obstacle is located, and on the relative position of the vehicles that are in the lane containing the obstacle and adjacent lanes;

and wherein vehicles respond to orders that have been transmitted, and perform hard braking, light braking, maintain speed, resume previous speed, perform a lane change, abort a lane change or create a gap, as commanded, and wherein simultaneous additional sensor measurements are taken on a lead vehicle, or sensors on the highway, to improve the estimate of the position of the obstacle, and wherein the method iterates, using the updated estimate of the position of the obstacle, and a knowledge of the previous actions that have been commanded, to generate a new set of commands for the affected vehicles.

10. The method of claim 9 wherein vehicles communicate with a traffic management facility responsible for monitoring and regulating traffic flow.

11. The method of claim 9 wherein vehicles communicate with each other using transponders.

12. An obstacle avoidance method for use with automated vehicles that use an automated highway having at least two adjacent automated lanes, that minimizes the impact of the automated vehicles with a non-vehicle obstacle, said method comprising the steps of:

providing a set of decision rules for determining whether affected vehicles that could potentially impact the non-vehicle obstacle should change lanes or brake to minimize the expected impact with the obstacle;

sensing the presence of the non-vehicle obstacle in one of the automated lanes; and causing the affected vehicles to perform the series of coordinated avoidance maneuvers to avoid collision with the non-vehicle obstacle and with the other affected vehicles.

13. The method of claim 12 wherein an estimated position of the obstacle is treated probabilistically to minimize the expected drop in forward vehicle speed due to the collision with the obstacle.

14. The method of claim 12 wherein an estimated position of the obstacle is determined using sensor measurements.

15. The method of claim 12 wherein the series of coordinated avoidance maneuvers cause vehicles in the same lane as the obstacle to change lanes in the smallest possible safe distance.

16. The method of claim 12 further comprising the step of determining by an iterative process a series of coordinated avoidance maneuvers for affected vehicles in the lane containing the obstacle and in lanes adjacent to the lane containing the obstacle in accordance with the set of decision rules, an estimate of the position of the obstacle, the positions and velocities of other affected vehicles and the geometry of the highway.

17. The method of claim 12 wherein, upon each iteration, said determining step includes the step of determining the series of coordinated avoidance maneuvers using an updated estimate of the location of the obstacle and knowledge of previous actions that have been taken.

18. The method of claim 12 wherein the automated vehicles communicate with a traffic management facility responsible for monitoring and regulating traffic flow.

19. The method of claim 12 wherein the automated vehicles communicate with each other using transponders.

20. An obstacle avoidance method for use with automated vehicles that use an automated highway having at least two adjacent automated lanes, that minimizes the impact of the automated vehicles with an obstacle, said method comprising the steps of:

providing a set of decision rules for determining whether affected vehicles that could potentially impact the obstacle should change lanes or brake to minimize the expected impact with the obstacle;

sensing the presence of the obstacle in one of the automated lanes;

causing each of the affected vehicles to perform the series of coordinated avoidance maneuvers in accordance with the set of decision rules wherein the affected vehicles cooperatively brake and change lanes to avoid collision with the obstacle and with the other affected vehicles;

wherein the probabilistic estimate of the position of the obstacle is determined by a decision-making process that iterates a plurality of times, wherein on each iteration, the best current estimate of position of the obstacle, knowledge of any previous action that has been taken, positions and velocities of the affected vehicles, and the geometry of the highway, are processed to determine a course of action for affected vehicles;

and wherein the highway is divided into a series of longitudinal zones, and at each decision time, an action is chosen based on the best estimate of the zone in which the obstacle is located, and on the relative position of the vehicles that are in the lane containing the obstacle and adjacent lanes;

and wherein commands are sent to each affected vehicle that cause them to perform hard braking, light braking, maintain speed, resume previous speed, perform a lane change, abort a lane change or create a gap, as commanded;

and wherein the estimate of the position of the obstacle is improved on each iteration of the decision-making process and wherein new commands are generated for the affected vehicles after each iteration that minimize the impact of the automated vehicles with the obstacle.

* * * * *

UNITED STATES PATENT AND TRADEMARK OFFICE
CERTIFICATE OF CORRECTION

PATENT NO. : 6,026,347  
DATED : February 15, 2000  
INVENTOR(S) : Schuster

Page 1 of 1

It is certified that error appears in the above-identified patent and that said Letters Patent is hereby corrected as shown below:

Column 3,  
Line 30, delete "Shown" and replace with -- shown --.

Column 7,  
Line 58, delete "hard braking 29" and replace with -- hard braking 26 --.

Column 8,  
Line 30, delete "vehicle 1" and replace with -- vehicle 11 --.

Column 9,  
Table 1, delete "LS Exclusive Zone" and replace with -- LS Exclusion Zone --.

Table 1, delete "RS Exclusive Zone" and replace with -- RS Exclusion Zone --.  
Line 45, delete "vehicles 1" and replace with -- vehicles 11 --.

Signed and Sealed this

Seventh Day of May, 2002

Attest:

Attesting Officer

JAMES E. ROGAN  
*Director of the United States Patent and Trademark Office*